United States Patent [19]
Holmes et al.

[11] 3,762,978

[45] Oct. 2, 1973

[54] METHOD FOR IMPROVING THE ADHESION BETWEEN SILICONE ELASTOMERS

[75] Inventors: George W. Holmes, Walnut Creek, Calif.; Eldon E. Frisch, Midland, Mich.

[73] Assignee: Dow Corning Corporation, Midland, Mich.

[22] Filed: July 15, 1971

[21] Appl. No.: 163,073

[52] U.S. Cl......... 156/308, 117/47 A, 117/161 ZA, 156/3, 156/316, 156/329, 161/206
[51] Int. Cl...................... B32b 25/20, B32b 31/22
[58] Field of Search.................... 156/308, 316, 329, 156/3; 161/206; 117/47 A, 161 ZA

[56] References Cited
UNITED STATES PATENTS

| | | | |
|---|---|---|---|
| 3,108,898 | 10/1963 | Nitzsche et al. | 156/329 X |
| 3,142,582 | 7/1964 | Koretzky et al. | 117/47 A |
| 3,455,762 | 7/1969 | Harper | 156/329 X |
| 3,567,493 | 3/1971 | Wessel | 156/308 X |
| 3,647,591 | 3/1972 | Morris | 156/316 X |
| 3,686,731 | 8/1972 | Koori et al. | 156/329 X |
| 3,698,982 | 10/1972 | Griffin | 156/308 |

*Primary Examiner*—Harold Ansher
*Attorney*—Robert F. Fleming, Jr. et al.

[57] ABSTRACT

A cured silicone elastomer prepared from a composition containing silicon-bonded alkoxy radicals is contacted with a strong mineral acid, washed with water until free of acid, dried and thereafter a room temperature vulcanizable silicone elastomer composition is applied thereto and allowed to cure whereby an improved bond between the two silicone elastomers is realized.

7 Claims, No Drawings

METHOD FOR IMPROVING THE ADHESION BETWEEN SILICONE ELASTOMERS

This invention relates to a method of bonding a room temperature vulcanizable silicone elastomer which is applied in the uncured state, to a cured silicone elastomer which contains silicon-bonded alkoxy radicals in the uncured composition.

The application of an uncured silicone elastomer to a cured silicone elastomer surface and the subsequent curing of the combination often results in the curing of the silicone elastomer without the adhesion of that silicone elastomer to the cured silicone elastomer. Since the bonding of silicone elastomer to a cured silicone elastomer is frequently demanded by the consumers of such products, the prior art has devised numerous methods to accomplish this. However, all such methods of adhering a silicone elastomer, which is applied in the uncured state, to a cured silicone elastomer do not encompass the broad spectrum of different silicone elastomers. For example, the method for obtaining adhesion of a silicone elastomer which is peroxide vulcanizable and applied in the unvulcanized state, to a vulcanized silicone elastomer which is vulcanized by a peroxide is not necessarily applicable to situations wherein one of the silicone elastomers is vulcanized at room temperature.

Room temperature vulcanizable silicone elastomers which comprise an organosilicon polymer, silicon-bonded alkoxy radicals and a curing catalyst, once cured, do not provide a surface to which room temperature vulcanizable silicone elastomers readily adhere. To obtain adhesion under such circumstances, the prior art has used primer compositions and adhesive compositions which are sometimes exotic.

It is therefore an object of the present invention to provide a less exotic method for improving the adhesive bond between cured silicone elastomers which are derived from alkoxy-containing compositions and which vulcanize at room temperature and room temperature vulcanizable silicone elastomers applied in the uncured state and thereafter vulcanized.

This invention relates to a method for improving the adhesion between silicone elastomers comprising (1) contacting a cured silicone elastomer with a strong mineral acid for a period of at least one second, wherein said cured silicone elastomer comprises prior to curing a polydiorgano-siloxane having organic groups selected from the group consisting of methyl radicals, ethyl radicals, vinyl radicals and phenyl radicals where at least 50 percent of the organic groups are methyl radicals, said polydiorganosiloxane having a viscosity of from 500 to 100,000 cs. at 25° C. inclusive and having endblocking groups selected from the group consisting of hydroxyl groups, trialkoxysiloxy groups and monoorganodialkoxysiloxy groups wherein the organic radicals are defined above and the alkoxy radicals have from 1 to 6 carbon atoms per alkoxy radical, from 0 to 15 parts by weight per 100 parts by weight of the polydiorganosiloxane of an alkoxy silicon compound selected from the group consisting of monoorganotrialkoxysilanes, tetraalkoxysilanes, partial hydrolyzates thereof and mixtures thereof, where at least one part by weight of the alkoxy silicon compound is present when the polydiorganosiloxane is endblocked by hydroxyl groups, and a curing catalyst for the silicone elastomer thereafter, (2) washing the cured silicone elastomer with water until resulting wash water is free of acid, (3) drying the washed cured silicone elastomer at a temperature less than 50° C., thereafter, (4) applying an uncured silicone elastomer composition which cures at room temperature, said uncured silicone elastomer composition comprising polydiorganosiloxane as defined in (1) above wherein the endblocking groups are selected from the group consisting of hydroxyl groups, trialkoxysiloxy groups, monoorganodialkoxysiloxy groups, triacetoxysiloxy groups, monoorganodiacetoxysiloxy groups, triketoximesiloxy groups, and monoorganodiketoxime siloxy groups, where the alkoxy groups and the organic groups are defined in (1) and the ketoxime radical has a formula $-O-N=CR_2$ where R is selected from methyl radicals, ethyl radicals and phenyl radicals, from 0 to 15 parts by weight of a crosslinking agent per 100 parts by weight of the polydiorganosiloxane defined in (4), said crosslinking agent being selected from the group consisting of monoorganotrialkoxysilane, tetraalkoxysilane, partial hydrolyzates of the alkoxy silanes, monoorganotriacetoxysilane, and monoorganotriketoximesilane and mixtures thereof, and a curing catalyst for the composition, (5) allowing the uncured silicone elastomer composition to cure whereby an improved adhesive bond to the cured silicone elastomer of (1) is obtained.

The alkoxy-containing room temperature vulcanizable silicone elastomers are well known in the art. These room temperature vulcanizable silicone elastomers comprise a polydiorganosiloxane where the organic radicals are methyl, phenyl, ethyl or vinyl where the viscosity can be from 500 to 100,000 cs. at 25° C., preferably from 1,000 to 50,000 cs. at 25° C., and where the polydiorganosiloxane is endblocked by silicon-bonded hydroxyl groups or alkoxy siloxy groups which are trialkoxysiloxy groups and monoorganodialkoxysiloxy groups. At least 50 percent of the organic groups in the polydiorganosiloxane are methyl radicals and preferably at least 80 percent are methyl radicals. The alkoxy radical can have from 1 to 6 carbon atoms per alkoxy radical such as methoxy, ethoxy, propoxy, isopropoxy, butoxy, isobutoxy, pentoxy and hexoxy.

The room temperature vulcanizable silicone elastomer compositions which are alkoxy-containing are known in the art in two basic types which relate to the storage techniques used. One type is known as a two component or two package room temperature vulcanizable silicone elastomer, since the total curable composition is stored in at least two packages because when the ingredients are mixed, the composition immediately begins curing. The other type is a one component or one package room temperature vulcanizable silicone elastomer, since all the ingredients can be stored in one container if moisture is excluded and the composition cures when exposed to moisture.

The two package room temperature vulcanizable silicone elastomers comprise a hydroxyl endblocked polydiorganosiloxane fluid, an alkoxy silicon compound and a curing catalyst. The combination of these three ingredients cures when mixed and thus both the alkoxy silicon compound and the curing catalyst are not mixed with the hydroxyl endblocked polydiorganosiloxane until cure is desired.

The alkoxy silicon compounds can include monoorganotrialkoxysilane, tetraalkoxysilane and partial hydrolyzates thereof. The tetraalkoxysilanes can be illustrated by tetraethoxysilane, tetra-n-propoxysilane, tetrapentoxysilane, methoxytriethoxysilane, diethoxydipropoxysilane and tetrahexoxysilane. The partial hydrolyzates of the tetraalkoxysilanes are known as alkylpolysilicates which can be illustrated by ethylpolysilicate, isopropylpolysilicate, n-butylpolysilicate, n-propylpolysilicate and hexylpolysilicate. The monoorganotrialkoxysilanes can be illustrated by methyltrimethoxysilane, ethyltriethoxysilane, vinyltriethoxysilane, phenyltrimethoxysilane, phenyltributoxysilane and the partial hydrolyzates thereof. The alkoxy silicon compound is present in an amount of from 1 to 15 weight percent based on 100 parts by weight of the polydiorganosiloxane when the polydiorganosiloxane is hydroxyl endblocked.

The curing catalysts are well known in the art and a particularly suitable class of curing catalysts are the metal salts of carboxylic acids which can be illustrated by dibutyltindiacetate, dibutyltindilaurate, lead naphthenate, cobalt naphthenate, zinc naphthenate, iron-2-ethylhexoate, lead 2-ethylhexoate, chromium octoate, dibutyltin dibenzoate, dibutyltin adipate, dibutyltin dilactate, lead octoate, stannous octoate, tin ricinoleate, dioctyltin monoacetate and the like.

The room temperature vulcanizable silicone elastomers of the two package type are described in the art in more detail with respect to ingredients and procedures in the following patents, U.S. Pat. No. 2,843,555 by Berridge, U.S. Pat. No. 2,927,902 by Polmanteer, U.S. Pat. No. 3,065,194 by Nitzsche et al., U.S. Pat. No. 3,127,363 by Nitzsche et al. and U.S. Pat. No. 3,154,515 by Berridge which are hereby fully incorporated by reference.

The room temperature vulcanizable silicone elastomers which are one package storable can be prepared from either hydroxyl endblocked polydiorganosiloxane fluids or trialkoxysiloxy or monoorganodialkoxysiloxy endblocked polydiorganosiloxane fluids. The trialkoxysiloxy endblocked polydiorganosiloxane fluids and the monoorganodialkoxysiloxy endblocked polydiorganosiloxane fluids are defined above and are well known in the art as described in U.S. Pat. No. 3,161,614 by Brown et al. which is hereby fully incorporated by reference. These trialkoxysiloxy endblocked polydiorganosiloxane fluids and monoorganodialkoxysiloxy endblocked polydiorganosiloxane fluids do not require additional alkoxy silicon compounds to provide a room temperature vulcanizable silicone elastomer. However, alkoxy silicon compounds can also be added to the alkoxysiloxy endblocked polydiorganosiloxane fluids. These one package room temperature vulcanizable silicone elastomers cure to a silicone elastomer when a curing catalyst is present and when they are exposed to moisture. The curing catalyst can be the metal salts of carboxylic acids as described above, titanium esters such as tetrabutyltitanate, tetra-2-ethylhexyltitanate, tetraphenyltitantate, tetraoctadecyl-titanate, triethanolaminetitanate, octyleneglycoltitanate and bis-acetylacetonyldiisopropyltitanate, amines such as hexylamine, dodecylamine, amine salts such as hexylamineacetate, dodecylaminephosphate, quaternary amine salts such as benzyltrimethylammoniumacetate and potassium acetate.

One package room temperature vulcanizable silicone elastomers can also be prepared from the hydroxyl endblocked polydiorganosiloxane fluids as illustrated by U.S. Pat. No. 3,151,099 by Ceyzeriat et al. and U.S. Pat. Nos. 3,294,739 and 3,334,067 by Weyenberg which are all hereby fully incorporated by reference. The hydroxyl endblocked polydiorganosiloxane fluid is mixed with tetraalkoxysilane or the partial hydrolyzate thereof and a tetraalkyltitanate or tetraalkylzirconate under anhydrous conditions, as described by Ceyzeriat et al. The tetraalkoxysilane and the partial hydrolyzates thereof are defined above. The composition is stable under anhydrous conditions but cures when exposed to moisture. Weyenberg describes mixing under anhydrous conditions a hydroxyl endblocked polydiorganosiloxane fluid, a tetraalkoxysilane or monoorganotrialkoxysilane which are defined above and a titanium catalyst, one type being an organosiloxy titanium compound, the other being a beta-dicarbonyl titanium compound. The organosiloxy titanium compounds can be illustrated by [(CH$_3$)$_3$SiO]$_4$Ti, [(CH$_3$)$_3$SiO]$_2$Ti[OCH(CH$_3$)$_2$]$_2$, [(C$_6$H$_5$)$_3$SiO]Ti[OCH(CH$_3$)$_2$]$_3$ and the like as further described in U.S. Pat. No. 3,294,739. The beta-dicarbonyl titanium compounds can be illustrated by bis(acetylacetoxyl)diisopropyltitanate,

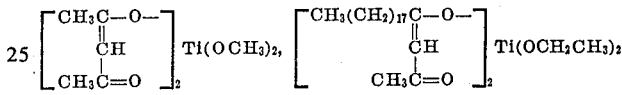

bis(acetylacetonyl)diacetatetitanate and the like as further described in U.S. Pat. No. 3,334,067.

The alkoxy-containing room temperature vulcanizable silicone elastomers can contain fillers or other materials conventionally used in room temperature vulcanizable silicone elastomers. Examples of fillers are carbon black, glass, aluminum silicate, diatomaceous earth, ground quartz, fume silica, silica xerogel, precipitated silicas, alumina, titania, zirconia, zinc oxide, ferric oxide, magnesium oxide, phthalocyanine and copper phthalocyanine.

The above described alkoxy-containing room temperature vulcanizable silicone elastomers in this invention are the cured silicone elastomers to which other silicone elastomers are to be bonded and therefore are the cured silicone elastomers which are contacted by the strong mineral acid. These alkoxy-containing room temperature vulcanizable silicone elastomers are also included in the uncured room temperature vulcanizable silicone elastomers which are being bonded to the cured silicone elastomer. In addition to the alkoxy-containing room temperature vulcanizable silicone elastomers, acetoxy-containing and ketoxime-containing room temperature vulcanizable silicone elastomers can be used in this invention as the room temperature vulcanizable silicone elastomer which is applied in the uncured state.

The acetoxy-containing room temperature vulcanizable silicone elastomers are well known in the art and are described in the following patents. U.S. Pat. No. 3,035,016 by Bruner teaches monoorganodiacetoxysiloxy endblocked polydiorganosiloxane fluids as room temperature vulcanizable silicone elastomers which are stable under anhydrous conditions and cure upon exposure to moisture, a one package storable composition.

U.S. Pat. No. 3,061,575 by Russell teaches a hydroxyl endblocked polydiorganosiloxane fluid reacting with a monoorganotriacetoxysilane and magnesium oxide to provide a room temperature vulcanizable silicone elastomer. This composition is a two package storable composition which cures spontaneously when the ingredients are mixed. The hydroxyl endblocked polydiorganosiloxane can also be mixed with monoorganodiacetoxysiloxy endblocked polydiorganosiloxane fluid in the presence of magnesium oxide to provide the room temperature vulcanizable silicone elastomer.

U.S. Pat. No. 3,077,465 by Bruner describes room temperature vulcanizable silicone elastomers as described above in U.S. Pat. No. 3,035,016 using a metal salt of a carboxylic acid as a curing catalyst. These metal salts of carboxylic acids have already been described above.

U.S. Pat. No. 3,133,891 of Ceyzeriat describes a composition which is a mixture of a hydroxyl endblocked polydiorganosiloxane fluid and a monoorganotriacetoxysilane and is stable upon storage in the absence of moisture and cures to a silicone elastomer whPn exposed to moisture at room temperature. The mixture can contain organic acid or amine catalysts as well as tin catalyst. U.S. Pat. No. 3,240,731 by Nitzsche et al. describes a similar acetoxy-containing room temperature vulcanizable silicone elastomer but in addition also an anhydride of a carboxylic acid to improve the shelf life of the one package composition. Additionally, U.S. Pat. No. 3,274,145 by Dupree and U.S. Pat. No. 3,382,205 by Beers describe other features of acetoxy-containing room temperature vulcanizable silicone elastomers.

The above patents relating to acetoxy-containing room temperature vulcanizable silicone elastomers are hereby fully incorporated by reference. The organic groups of the various siloxanes and silanes are the same as defined for the alkoxy-containing polydiorganosiloxane fluids and silanes. The acetoxysilanes are present in the room temperature vulcanizable silicone elastomer from 0 to 15 parts by weight based on 100 parts of the polydiorganosiloxane fluid. The acetoxysilanes are required when the polydiorganosiloxane fluid is hydroxyl endblocked, however, when the polydiorganosiloxane is endblocked with triacetoxysiloxy or monoorganodiacetoxysiloxy groups the acetoxysilanes may be absent. The acetoxy-containing room temperature vulcanizable silicone elastomers cure without the presence of a curing catalyst, however, it is preferred to use a curing catalyst as described above.

The ketoxime-containing room temperature vulcanizable silicone elastomers are well known in the art and are described in U.S. Pat. No. 3,189,576 by Sweet and U.S. Pat. No. 3,184,427 by Russell et al. which are hereby fully incorporated by reference. U.S. Pat. No. 3,189,576 describes ketoxime-containing room temperature vulcanizable silicone elastomers which comprise polydiorganosiloxane fluids having endblocking units of monoorganodiketoxime siloxy groups of the formula $(R_2C=NO)_2R'SiO_{0.5}$ or triketoximesiloxy groups of the formula $(R_2C=NO)_3SiO_{0.5}$ where R' is a methyl radical, an ethyl radical a vinyl radical or a phenyl radical and R is a methyl radical, ethyl radical or a phenyl radical, or comprises mixtures of hydroxyl endblocked polydiorganosiloxane fluids and ketoxime silanes including monoorganotriketoxime silanes of the formula $R'Si(ON=CR_2)_3$ where R and R' are defined above. The ketoxime-containing room temperature vulcanizable silicone elastomers can contain curing catalysts or other curing aids as the carboxylic acid anhydride-magnesium oxide described in U.S. Pat. No. 3,184,427. However, the compositions cure upon exposure to moisture without a catalyst and when prepared under anhydrous conditions and stored under anhydrous conditions they do not cure until exposed to moisture thus being suitable as a one package composition. Fillers as defined above and other materials conventionally used in room temperature vulcanizable silicone elastomers can also be included in these compositions. The ketoxime silanes are present in amounts from 1 to 15 parts by weight when the polydiorganosiloxane fluid is hydroxyl endblocked and can be absent when the polydiorganosiloxane fluid is endblocked with monoorganodiketoximesiloxy groups or triketoximesiloxy groups. The amounts of ketoximesilane are based on 100 parts by weight of the polydiorganosiloxane fluid.

The method for improving the adhesion between the cured silicone elastomers which are the alkoxy-containing room temperature vulcanizable silicone elastomers stated above and the room temperature vulcanizable silicone elastomers which are applied in the uncured state to the cured silicone elastomer comprise contacting the cured silicone elastomer with a strong mineral acid for a period of time sufficient to impart the improved adhesion characteristic, which is at least one second.

The strong mineral acids can be any of those known in the art including hydrochloric acid, perchloric acid hydrobromic acid, hydroiodic acid, nitric acid, phosphoric acid, sulfurous acid and sulfuric acid. For the purpose of this invention, a strong acid has a first ionization constant of at least $10^{-2}$ at room temperature in water. The first ionization constant refers to the ionization constant for the first hydrogen ion to ionize from the acid. The strong mineral acids can be in dilute aqueous or organic solvent solutions such as alcohols in concentrations as low as 1.0 weight percent. It is preferred, hoever, to use more highly concentrated strong mineral acids such as concentrated sulfuric acid, since the results are more consistent and the improvement of the adhesion reaches an optimum.

The surface of the cured silicone elastomer to which the uncured room temperature vulcanizable silicone elastomer is to be adhered is contacted with the strong mineral acid for at least one second, preferably at least 10 seconds contact time is desirable. The contact time can be 5 minutes and even longer up to 30 minutes with the dilute strong mineral acids wherein the concentration is 1.0 weight percent. Preferably, however, 10 seconds to 5 minutes is sufficient with any of the strong mineral acids at any concentration to enhance the adhesion of the silicone elastomer which is applied in the uncured state to the cured silicone elastomer after the uncured silicone elastomer cures in contact with the treated surface. The cured silicone elastomer surface can be contacted with the strong mineral acid by any of several methods such as by immersing the cured silicone elastomer object in a strong mineral acid, allowing the strong mineral acid to run over the particular surface of the cured silicone elastomer where adhesion is desired, dabbing the particular surface of the cured silicone elastomer where adhesion is desired with a sponge or other porous material saturated with a strong mineral acid, and the like.

The contact times can be varied with the specific strong mineral acid used and its concentration to achieve adhesive results which correspond to the users needs. Although the dilute strong mineral acids increase the adhesion of the silicone elastomers described herein, a bond which fails 100 percent cohesively may not consistently be realized. However, a bond which fails only 100 percent cohesively is not required in all use situations. The bond strengths and the amount of cohesive failure required in any particular use situation is dependent upon the external forces to be applied on the bonded assembly. These external forces can be mechanical forces, such as tension, flexing and torque forces or chemical forces such as water, fuels, solvents, salts, gases and the like which can penetrate and destroy the adhesive bonds. The amount of mechanical and/or chemical forces placed on the bonded assembly including any desired safety factors will determine the type and strength of any adhesive bond. This places the level of performance on the bonded assembly. Certainly, bonded assemblies which fail only 100 percent cohesively are usable in all situations where a permanent bond is desired. However, where the adhesive bond is required to have a specified strength during use of the bonded assembly and where the bonded assembly houses a functioning part which may require repair periodically, the bonding interface would preferably be a bond which fails adhesively, so that the assembly can be separated, the functioning part repaired and the assembly again bonded to provide its housing function of protecting the functioning part.

The most preferred strong mineral acid for forming bonds between the silicone elastomers is sulfuric acid at a concentration of from 80 to 100 weight percent where the diluent is water. The contact time for this sulfuric acid is preferably from one second to 10 minutes. Since this highly concentrated sulfuric acid is extremely active and also dangerous at high temperatures, the temperature of the sulfuric acid during contact with the cured silicone elastomer is preferably from 10° to 40° C. The most preferred contact conditions using sulfuric acid are to use sulfuric acid solution having 90 to 98 weight percent sulfuric acid which is at a temperature of 20° to 30° C. where the contact time is from 10 seconds to 3 minutes.

After the strong mineral acid has contacted the cured silicone elastomer for a suitable time, the surface of the cured silicone elastomer which was contacted by the strong mineral acid is washed with water until the resulting wash water is free of acid. The acid surface is preferably immediately washed after the acid contact time has elapsed. The washing can be carried out by any of several convenient methods. The cured silicone elastomer after the acid treatment can be immersed consecutively in containers of water until the wash water is free of acid, it can be immersed in a container of water where fresh water is circulated continuously, it can be washed by running water over the treated surface until the water is free of acid and the like. The time necessary to wash the cured silicone elastomer free from acid can vary considerably, from as little as one second to 24 hours or longer. The time the water contacts the cured silicone rubber after acid treatment is not narrowly critical, since after the surface of the cured silicone elastomer has been washed free of acid, the cured silicone elastomer can be stored in water until it is needed which can be several days without effecting the final adhesive bond. The washing time is usually from one minute to one hour. The water temperature can conveniently be from 5° to 40° C. and preferably from 20° to 30° C.

After the acid has been removed from the surface of the cured silicone elastomer and it is desired to apply the uncured room temperature vulcanizable silicone elastomer, the surface of the cured silicone elastomer is dried. Since the drying step can influence the final adhesive bond if the temperature is too high, the type of drying technique is somewhat limited. Any of the drying techniques used, therefore, should not involve temperatures above 50° C., since above that temperature the surface characteristics of the cured silicone elastomer which are gained by the acid treatment are negatively effected. A variety of drying techniques can, however, be used. The drying can be done by placing the cured silicone elastomer in a vacuum, by passing an inert gas over the surface of the cured silicone elastomer, such gases can be dry air, dry nitrogen and the like, by allowing the cured silicone elastomer to be exposed to ambient air and by rinsing the cured silicone elastomer surface with a volatile organic solvent which will remove the water and also evaporate quite rapidly after the surface has been rinsed. For convenience, the surface of the washed cured silicone elastomer is preferably dried by rinsing the surface with a volatile organic solvent such as acetone, methanol, ethanol or isopropanol, and the like, and then allowing the volatile organic solvent to evaporate. The volatile organic solvents which are miscible with water are preferably used since they will wash the water away faster. The water can readily be removed by rinsing the cured silicone elastomer surface for one minute to 5 minutes, however, times up to one hour can be used if needed. The volatile organic solvent is conveniently and preferably used at room temperature, such as from 20° to 30° C., however, lower temperatures are also suitable such as to 5° C.

After the surface of the cured silicone elastomer has been dried, the uncured room temperature vulcanizable silicone elastomer is applied. Any of the room temperature vulcanizable silicone elastomers described above can be used. These uncured silicone elastomers are applied over the surface of the cured silicone elastomer which had been treated. The uncured silicone elastomer is then allowed to cure at room temperature or if desired increasing the temperature can increase the rate of cure. Once the room temperature vulcanizable silicone elastomer cures, the adhesive bond between the cured silicone elastomers is improved compared to applying a room temperature vulcanizable silicone elastomer to a surface of a cured silicone elastomer wherein the surface had not been so treated. Such improvement of the adhesive bond can be pronounced enough to change the adhesion from a bond which is weakly adhesive to a bond which is 100 percent cohesive.

The method of improving the adhesive bond is convenient since readily available materials are used and since the uncured silicone elastomer is fluid enough to be applied to irregular shapes and molded into desired shapes and further two cured silicone elastomer pieces with surfaces which do not match can be bonded together. The resulting composites can take any shape or form and can be used in many areas, such as in making medical devices, electrical devices, protective devices, and the like. This invention is useful anywhere a room temperature vulcanizable silicone elastomer is to be applied to a cured silicone elastomer which was an alkoxy-containing room temperature vulcanizable silicone elastomer is the uncured state.

The following examples are illustrative only and should not be construed as limiting the present invention which is properly delineated in the claims.

EXAMPLE 1

An alkoxy-containing room temperature vulcanizable silicone elastomer was prepared by mixing 100 parts by weight of a hydroxyl endblocked polydimethylsiloxane fluid having a viscosity of 12,000 cs. at 25° C., 30 parts by weight of diatomaceous silica, 2 parts by weight of tetra-n-propoxysilane and to 100 parts by weight of the mixture, 0.3 parts by weight of stannous octoate was added. This silicone elastomer was allowed to cure in a slab. This cured silicone elastomer was divided into three test pieces then each piece was treated by one of the following methods.

A. No treatment
B. Soaked in water for a few minutes.
C. Immersed in dilute nitric acid, washed with water and then allowed to dry in air.

After each of the cured silicone elastomer test pieces was treated as in A., B. and C., the above defined alkoxy-containing room temperature vulcanizable silicone elastomer, freshly prepared was applied over the treated surface of each test piece. This silicone elastomer was allowed to cure and thereafter the adhesive bond between the silicone elastomers were observed. Treatments A. and B. resulted in no adhesive bond between the two silicone elastomers and they could be pulled apart with ease. Treatment C., however, resulted in a good adhesive bond and could not be pulled apart with one's hands.

EXAMPLE 2

Thirty test pieces, one inch by two inches, of the cured alkoxy-containing room temperature vulcanizable silicone elastomer described in Example 1 were prepared. Each test piece received one of the following treatments.

A. No treatment.
B. Immersed in an aqueous 5 weight percent hydrochloric acid solution for 10 minutes, washed with water for 5 minutes and dried by rinsing with acetone for 5 minutes and then exposing it to air until the acetone evaporated.
C. Immersed for 15 minutes in an isopropanol solution of 10 weight percent $H_3PO_4$ which had been prepared by mixing 85 weight percent phosphoric acid and enough polyphosphoric acid, $H_6P_4O_{13}$, to consume the water providing 100 percent $H_3PO_4$, wash with water for 5 minutes and dried by rising with acetone and then exposing it to air until the acetone evaporated.
D. Immersed in concentrated sulfuric acid (98 weight percent $H_2SO_4$) for one minute, washed with water for 5 minutes and dried by rinsing with acetone for 5 minutes and then exposing it to air until the acetone evaporated.
E. Soaked in acetone for 5 minutes and then exposing to air until the acetone evaporated.

As described in Example 1, uncured alkoxy-containing room temperature vulcanizable silicone elastomers, freshly prepared, was applied to each of the treated test pieces, allowed to cure and then the adhesive bond between the silicone elastomers was observed. In this series of experiments six test pieces of cured silicone elastomer were each treated by the same method and the adhesive results shown below is the average of the six test pieces. The adhesion between the silicone elastomers was determined by attempting to separate the test pieces by hand. A scale for rating the strength of the adhesive bond was 1 through 10, with a rating of 1 being no bond and a rating of 10 being complete cohesive failure. A 10 rate would be equal to a single piece of cured silicone elastomer without any bond joint. The adhesive results were as follows: A. had a rating of 1, B. a rating of 4, C. a rating of 7, D. a rating of 10 and E. a rating of 2.

EXAMPLE 3

A test sample of an acetoxy-containing room temperature vulcanizable silicone elastomer was prepared as described in Example 1 and allowed to cure 24 hours. The cured silicone elastomer was then immersed in sulfuric acid being 96 weight percent $H_2SO_4$ and the remainder water for 30 seconds and then immediately washed in large amounts of water for 5 minutes until no more acid was being removed. The washed cured silicone elastomer was then rinsed with acetone for 5 minutes and allowed to dry in air for 15 minutes before applying uncured alkoxy-containing room temperature vulcanizable silicone elastomer as described in Example 1. The resulting assembly was allowed to stand 24 hours exposed to air to cure the freshly applied silicone elastomer. Attempts to break the assembly at the point of bonding was unsuccessful and therefore the adhesive bond was 100 percent cohesive.

EXAMPLE 4

The alkoxy-containing room temperature vulcanizable silicone elastomer as described in Example 1 was cured. One sample of the cured silicone elastomer was given no treatment and another sample was treated by immersing in concentrated sulfuric acid being 98 weight percent $H_2SO_4$, for one minute, washed with water for 5 minutes, rinsed in acetone for 5 minutes and then allowed to dry. To both of the samples of the cured silicone elastomer, treated and untreated, the following uncured room temperature vulcanizable silicone elastomers were applied and then allowed to cure for at least 24 hours before observing the adhesion between the silicone elastomers.

a. An acetoxy-containing room temperature vulcanizable silicone elastomer was prepared by mixing 140 parts by weight of a hydroxyl endblocked polydimethylsiloxane fluid having a viscosity of 14,000 cs. at 25° C., 25 parts by weight of a reinforcing silica, 10 parts by weight of a mixture being 50 weight percent methyltriacetoxysilane and 50 weight percent ethyltriacetoxysilane, and 1 part by weight of a mixture being 20 weight percent stannous oleate in a trimethylsiloxy endblocked polydimethylsiloxane fluid. This silicone elastomer, when applied to the untreated cured silicone elastomer, and cured showed adhesive failure and could readily be separated from the originally cured silicone elastomer. After the above treatment, the silicone elastomers failed only cohesively.

b. A ketoxime-containing room temperature vulcanizable silicone elastomer was prepared by mixing 140 parts by weight of the polydimethylsiloxane fluid described in a. above, 14 parts by weight of a reinforcing silica filler, 4 parts by weight of a hydroxyl endblocked polymethylphenylsiloxane fluid, 6 parts by weight of a white pigment, 9.5 parts by weight of

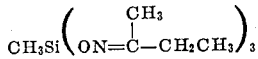

and 0.5 parts by weight of dibutyltindioctoate. This silicone elastomer when applied to the untreated cured silicone elastomer and cured, showed adhesive failure and could readily be separated from the originally cured silicone elastomer. After the above treatment, the silicone elastomers failed only cohesively.

EXAMPLE 5

The cured silicone elastomer, alkoxy-containing room temperature vulcanizable, as defined in Example 1, cured one day, was treated by contacting it with aqueous 20 weight percent hydrochloric acid solutions for the times specified below, washed with water for the times specified below and then allowed to dry by exposure to ambient air.

| Contact Time With HCl Solution, Minutes | Washing Time With Water, Minutes |
|---|---|
| 1 | 2 |
| 1 | 4 |
| 1 | 16 |
| 2 | 16 |
| 5 | 16 |

After the above treatments, uncured alkoxy-containing room temperature vulcanizable silicone elastomer as described in Example 1 was applied and allowed to cure. The bond was observed to fail cohesively in each of the above treating conditions.

That which is claimed is:

1. A method for improving the adhesion between silicone elastomers comprising
   1. contacting a cured silicone elastomer with a strong mineral acid for a period of at least one second, wherein said cured silicone elastomer comprises prior to curing a polydiorganosiloxane having organic groups selected from the group consisting of methyl radicals, ethyl radicals, vinyl radicals and phenyl radicals where at least 50 percent of the organic groups are methyl radicals, said polydiorganosiloxane having a viscosity of from 500 to 100,000 cs. at 25° C. inclusive and having endblocking groups selected from the group consisting of hydroxyl groups, trialkoxysiloxy groups and monoorganodialkoxysiloxy groups wherein the organic radicals are defined above and the alkoxy radicals have from 1 to 6 carbon atoms per alkoxy radical, from 0 to 15 parts by weight per 100 parts by weight of the polydiorganosiloxane of an alkoxy silicon compound selected from the group consisting of monoorganotrialkoxysilanes, tetraalkoxysilanes, partial hydrolyzates thereof and mixtures thereof, where at least one part by weight of the alkoxy material is present when the polydiorganosiloxane is endblocked by hydroxyl groups, and a curing catalyst for the silicone elastomer, thereafter,
   2. washing the cured silicone elastomer with water until the resulting wash water is free of acid,
   3. drying the washed cured silicone elastomer at a temperature less than 50° C., thereafter,
   4. applying an uncured silicone elastomer composition which cures at room temperature, said uncured silicone elastomer composition comprising polydiorganosiloxane as defined in (1) above wherein the endblocking groups are selected from the group consisting of hydroxyl groups, trialkoxysiloxy groups, monoorganodialkoxysiloxy groups, triacetoxysiloxy groups, monoorganodiacetoxysiloxy groups, triketoximesiloxy groups, and monoorganodiketoximesiloxy groups, where the alkoxy groups and the organic groups are defined in (1) and the ketoxime radical has a formula -O-N=CR$_2$ where R is selected from methyl radicals, ethyl radicals and phenyl radicals, from 0 to 15 parts by weight of a crosslinking agent per 100 parts by weight of the polydiorganosiloxane defined in (4), said crosslinking agent being selected from the group consisting of monoorganotrialkoxysilane, tetraalkoxysilane, partial hydrolyzates of the alkoxy silanes, monoorganotriacetoxysilane, and monoorganotriketoximesilane and mixtures thereof, and a curing catalyst for the composition,
   5. allowing the uncured silicone elastomer composition to cure whereby an improved adhesive bond to the cured silicone elastomer of (1) is obtained.

2. The method in accordance with claim 1 in which after step (2) the washed cured silicone elastomer is rinsed with a volatile organic solvent to remove any remaining water on the surface thereof and thereafter the drying of step (3) is carried out by allowing the cured silicone elastomer to dry by exposure to air under ambient conditions.

3. The method in accordance with claim 2 in which the cured silicone elastomer of (1) comprises prior to curing a polydiorganosiloxane having hydroxyl endblocking groups and the uncured silicone elastomer composition of (4) also comprises a polydiorganosiloxane having hydroxyl endblocking groups.

4. The method in accordance with claim 1 in which the strong mineral acid is selected from the group consisting of hydrochloric acid, nitric acid, phosphoric acid and sulfuric acid.

5. The method in accordance with claim 3 in which the strong mineral acid is selected from the group consisting of hydrochloric acid, nitric acid, phosphoric acid and sulfuric acid.

6. The method in accordance with claim 4 in which the strong mineral acid is sulfuric acid having no more than 10 weight percent water present.

7. The method in accordance with claim 5 in which the strong mineral acid in sulfuric acid having no more than 10 weight percent water present.

* * * * *